United States Patent
Yun

(10) Patent No.: US 8,761,979 B2
(45) Date of Patent: Jun. 24, 2014

(54) PROTECTING A HIGH VOLTAGE BATTERY IN A HYBRID ELECTRIC VEHICLE

(75) Inventor: Seok Young Yun, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 513 days.

(21) Appl. No.: 13/184,825

(22) Filed: Jul. 18, 2011

(65) Prior Publication Data

US 2012/0143419 A1 Jun. 7, 2012

(30) Foreign Application Priority Data

Dec. 3, 2010 (KR) ........................ 10-2010-0122697

(51) Int. Cl.
*B60L 15/10* (2006.01)
*B60W 20/00* (2006.01)
*H02P 23/00* (2006.01)
*H02P 9/10* (2006.01)

(52) U.S. Cl.
CPC ............ *B60W 20/106* (2013.01); *B60W 20/00* (2013.01); *H02P 23/0036* (2013.01); *H02P 9/107* (2013.01)
USPC ................... 701/22; 701/51; 701/54; 701/58; 701/63; 320/104; 320/137; 477/3; 290/40 R; 290/40 A

(58) Field of Classification Search
CPC ............ H02J 7/00; H02J 7/1415; H02H 7/18; B60W 20/00; B60W 20/106; B60W 20/50; B60W 10/08; H02P 23/0036; H02P 9/00; H02P 9/107
USPC ............ 701/22, 51, 54, 58, 63; 320/104, 137; 477/3; 290/40 R, 40 A
See application file for complete search history.

(56) References Cited

U.S. PATENT DOCUMENTS

| | | | | |
|---|---|---|---|---|
| 6,135,914 | A * | 10/2000 | Yamaguchi et al. | 477/3 |
| 7,117,965 | B2 * | 10/2006 | Yatabe et al. | 180/65.235 |
| 2001/0011051 | A1 * | 8/2001 | Hattori et al. | 477/121 |
| 2001/0056009 | A1 * | 12/2001 | Ochiai et al. | 477/121 |
| 2002/0094908 | A1 * | 7/2002 | Urasawa et al. | 477/3 |
| 2003/0102673 | A1 * | 6/2003 | Nada | 290/40 C |
| 2003/0137275 | A1 * | 7/2003 | Suzuki et al. | 320/104 |
| 2009/0075779 | A1 * | 3/2009 | Kumazaki et al. | 477/3 |

(Continued)

FOREIGN PATENT DOCUMENTS

| | | |
|---|---|---|
| JP | 10054262 A | 2/1998 |
| JP | 2006014386 A | 1/2006 |

(Continued)

*Primary Examiner* — Thomas Black
*Assistant Examiner* — Sara Nelson
(74) *Attorney, Agent, or Firm* — Edwards Wildman Palmer LLP; Peter F. Corless

(57) ABSTRACT

The present invention protects a high voltage battery in a hybrid electric vehicle. More particularly, it makes it possible to prevent a battery from being overcharged when a motor or an inverter system breaks, with the hybrid vehicle traveling. The technique for protecting a high voltage battery in a hybrid electric vehicle illustratively comprises: checking whether a motor functions properly; setting a virtual acceleration pedal value and keeping a present desired shifting map, when the motor breaks; determining a desired shifting stage according to the present desired shifting map based on the virtual acceleration pedal value; and, in certain embodiments, switching or keeping the engine control mode by comparing a value of a predetermined maximum engine speed region with the present engine speed in order to prevent high-speed rotation of the motor.

15 Claims, 4 Drawing Sheets

(56) References Cited

U.S. PATENT DOCUMENTS

| | | | |
|---|---|---|---|
| 2009/0243554 A1* | 10/2009 | Gu et al. | 320/162 |
| 2010/0063658 A1* | 3/2010 | Martin et al. | 701/22 |
| 2012/0109434 A1* | 5/2012 | Yun | 701/22 |
| 2013/0060410 A1* | 3/2013 | Crain et al. | 701/22 |
| 2013/0218392 A1* | 8/2013 | Aizawa et al. | 701/22 |

FOREIGN PATENT DOCUMENTS

| | | | |
|---|---|---|---|
| JP | 2010111182 A | | 5/2010 |
| KR | 1020020043898 A | * | 12/2002 |
| KR | 10-2009-0102896 | | 10/2009 |
| KR | 10-0921061 | | 10/2009 |

* cited by examiner

PROTECTING A HIGH VOLTAGE BATTERY IN A HYBRID ELECTRIC VEHICLE

CROSS-REFERENCE TO RELATED APPLICATION

This application claims under 35 U.S.C. §119(a) the benefit of Korean Patent Application No. 10-2010-0122697 filed Dec. 3, 2010, the entire contents of which are incorporated herein by reference.

BACKGROUND (a) Technical Field

The present invention relates to protecting a high voltage battery in a hybrid electric vehicle. More particularly, it relates to protecting a high voltage battery in a hybrid vehicle by preventing a battery from being overcharged when a motor and/or an inverter system break while the hybrid vehicle travels.

(b) Background Art

Hybrid electric vehicles include as main parts an engine, a transmission, and a motor, in which appropriate power for driving the vehicles are supplied by controlling the conditions of the parts, using a controller.

FIG. 1 shows a diagram schematically illustrating the connection of a battery 10 and a motor 40, which is a driving unit, in a common hybrid electric vehicle. As shown in FIG. 1, the hybrid electric vehicle includes the motor for driving the vehicle as a driving unit, other than an engine.

The motor 40, the driving unit, is connected to a high voltage battery 10 to be supplied with power from the high voltage battery and a DC voltage supplied from the high voltage battery is converted into AC voltage through an inverter system to operate the motor, such as a DC/DC converter 20 and a controller circuit 30, as may be appreciated by those skilled in the art.

Since the motor and the inverter system are operated by the power from the high voltage battery, the efficiency of the motor and the inverter system are considered to be more important. Accordingly, an interior permanent magnet synchronous motor having a large speed control region and a large torque control region is generally used.

However, the interior permanent magnet synchronous motor may damage the battery power by high voltage due to high-speed rotation of a permanent magnet, when the motor and the inverter system break.

In detail, in the interior permanent magnet motor that is used for high-performance control, high voltage due to the permanent magnet may be generated by the rotation of the motor when a fault occurs in a normal operation at a high speed. The generated high voltage overcharges and damages the high voltage battery, which is an energy storage in the hybrid vehicle, through the inverter system, such that the durability is reduced and the life span of the battery is considerably reduced.

Further, when the system fails to prevent the overcharging, a fire due to explosion of the battery may be generated at any time, such that it is difficult to ensure safety for a driver.

In order to solve the problems due to overcharging the high voltage battery, the problem due to overcharging has been prevented in the related art by controlling the operation through a predetermined specific shifting map when the motor breaks.

That is, various types of several desired shifting maps were implemented in accordance with the conditions of a vehicle, for a variable transmission in the related art, in consideration of the fuel efficiency and the acceleration performance, such that a specific shifting map is provided to prevent overcharging due to high-speed rotation of the motor when the motor breaks in the system.

Therefore, the operation is kept in accordance with the shifting map when the motor normally operates, but upper shift or lower shift is performed by the specific shifting map when the motor breaks, thereby alleviating the problem due to overcharging, in the related art.

However, the related art of adjusting the shifting map as described above also has a problem in that excessive shifting is required and that temporal overcharging may thus be generated by excessive shifting, due to a difference between a shifting map for a normal operation and a shifting map for a fault.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention relates to protecting a high voltage battery in a hybrid electric vehicle which makes it possible to prevent excessive shifting in accordance with switching to a desired shifting map and preclude a battery from being overcharged by high-speed rotation of a motor due to malfunction of the motor, by restricting the shifting stages and controlling the engine speed, when the motor and/or an inverter system break while the vehicle travels.

In one aspect, the present invention provides a method for protecting a high voltage battery in a hybrid electric vehicle, which includes: checking whether a motor functions properly; setting a virtual acceleration pedal value and keeping a present desired shifting map, when the motor breaks; and determining a desired shifting stage according to the present desired shifting map based on the virtual acceleration pedal value.

In one embodiment, the method further includes configuring (switching or keeping) an engine control mode based on comparing a value of a predetermined maximum engine speed region with the present engine speed in order to prevent high-speed rotation of the motor, after determining a desired shifting stage.

In another embodiment, the engine control mode is configured into an engine speed control, when the present engine speed is larger than or the same as the value of the maximum engine speed region.

In still another embodiment, the method further includes a step of configuring the engine control mode from the engine speed control to an engine torque control mode, in the case the engine control mode has been switched to the engine speed control mode and the present engine speed is lower than the value of the minimum engine speed region.

In yet another embodiment, the engine control mode is configured to remain in the engine torque control, when the present engine speed is lower than the value of the maximum engine speed region.

As described above, protecting a high voltage battery in a hybrid electric vehicle according to the present invention makes it possible to reduce excessive shifting when there is malfunction, by using the operational features of a variable transmission.

Further, according to the present invention, it is possible to prevent a battery from being overcharged due to high-speed rotation by restricting the shifting stages based on virtual acceleration pedal values and switching from engine torque control to speed control in a predetermined case, such that it is possible to protect a battery (e.g., which are often expensive) and to extend the life span of the battery.

Further, it is possible to prevent a fire in a vehicle and provide a more stable traveling performance for a driver, by preventing a battery from being overcharged in accordance with the present invention.

The above and other features of the invention are discussed herein.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
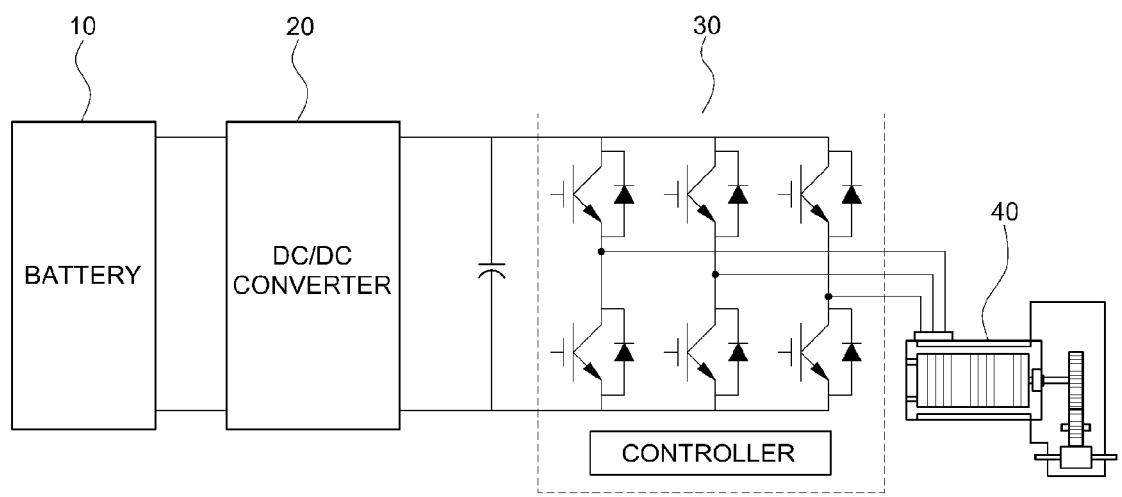
FIG. 1 is a diagram schematically illustrating the connection of a battery and a motor, which is a driving unit, in a common hybrid electric vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. The following examples illustrate the invention and are not intended to limit the same.

Also, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides a method for protecting a high voltage battery in a hybrid electric vehicle against overcharging when a motor breaks, in which a virtual acceleration pedal value is determined according to the motor speed for preventing the overcharging, with the present desired shifting map fixed/unchanged, such that the value is then applied to the fixed present desired shifting map, thereby performing shifting. Further, the method for protecting a high voltage battery in a hybrid electric vehicle can prevent the high voltage battery from being damaged by overcharging, by controlling the engine speed, in order to restrict the high-speed operation of the engine after shifting, in a predetermined case.

The terms used in the specification are used to describe only specific embodiments and are not intended to limit the present invention. The singular forms are intended to include the plural forms unless the context clearly indicates otherwise. It should be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, a method for protecting a high voltage battery in a hybrid electric vehicle according to the present invention is described in detail.

A method for protecting a high voltage battery in a hybrid electric vehicle according to the present invention provides a technical solution that makes it possible to protect a battery system against temporal overcharging due to excessive shifting while restricting excessive shifting of a transmission by restricting high-speed rotation of a motor when the motor breaks in a high-speed operation.

Therefore, according to the present invention, it is possible to protect the high voltage battery by providing a new method of controlling the shifting stages and the engine speed such that the motor is operated at a low speed and the high voltage battery is precluded from being overcharged, when the motor breaks.

The present invention fixes (i.e., keeps) the present desired shifting map right after the motor breaks to the shifting map of the vehicle, without using a specific shifting map when the motor breaks, in order to prevent the high voltage battery from being overcharged.

Further, shifting is performed such that the motor speed does not deviate to the overcharging state of the battery, by setting a virtual acceleration pedal value according to the fixed present shifting map and applying the value to the present desired shifting map.

The virtual acceleration pedal value is set in a manner that can control the motor speed such that the battery is not overcharged by high-speed rotation of the motor, in consideration of the present shifting map and the shifting stage, which are determined by the present vehicle speed and the acceleration pedal value.

In general, vehicles are provided with various desired shifting maps according to the traveling features to improve fuel efficiency, in which it is required to control a motor not to operate at a high speed, in order to prevent a battery from being overcharged when the motor breaks.

The present invention sets virtual acceleration pedal values based on the unchanged present desired shifting map and controls the shifting stages in accordance with the virtual acceleration pedal values while keeping the present desired shifting map, in order to prevent excessive shift and the motor from operating at a high speed.

Therefore, the virtual acceleration pedal values function as defect signals generated by malfunction of the motor and overcharging is prevented while the present shifting stage is switched or upper/lower shifting ("downshifting") is performed in accordance with the desired shifting map fitted to the present traveling condition by the virtual acceleration pedal value.

In this case, it is possible to reduce excessive shifting, as compared with when shifting is performed by a specific shifting map when malfunction occurs in the related art and it is possible to minimize shifting shock due to shifting.

Further, the present invention is configured to prevent the motor from operating at a high speed by the high-speed operation of the engine, due to control of shifting stages in accordance with the virtual acceleration pedal values and the rotation of the engine, after the shifting stages are controlled.

For this purpose, according to the present invention, the battery can be prevented from being overcharged by switching the control mode of the engine from a torque control mode to a speed control mode, when there is a possibility of the high-speed operation.

Therefore, high-speed rotation of the mode is prevented by setting a maximum engine speed region determined to prevent the motor from operating at a high speed, and switching the engine to the speed mode when the engine speed deviates from the maximum engine speed region, even if the motor breaks.

Hereinafter, a method for protecting a high voltage battery in a hybrid electric vehicle according to the present invention is described in detail with reference to the accompanying drawings.

Figure 2:
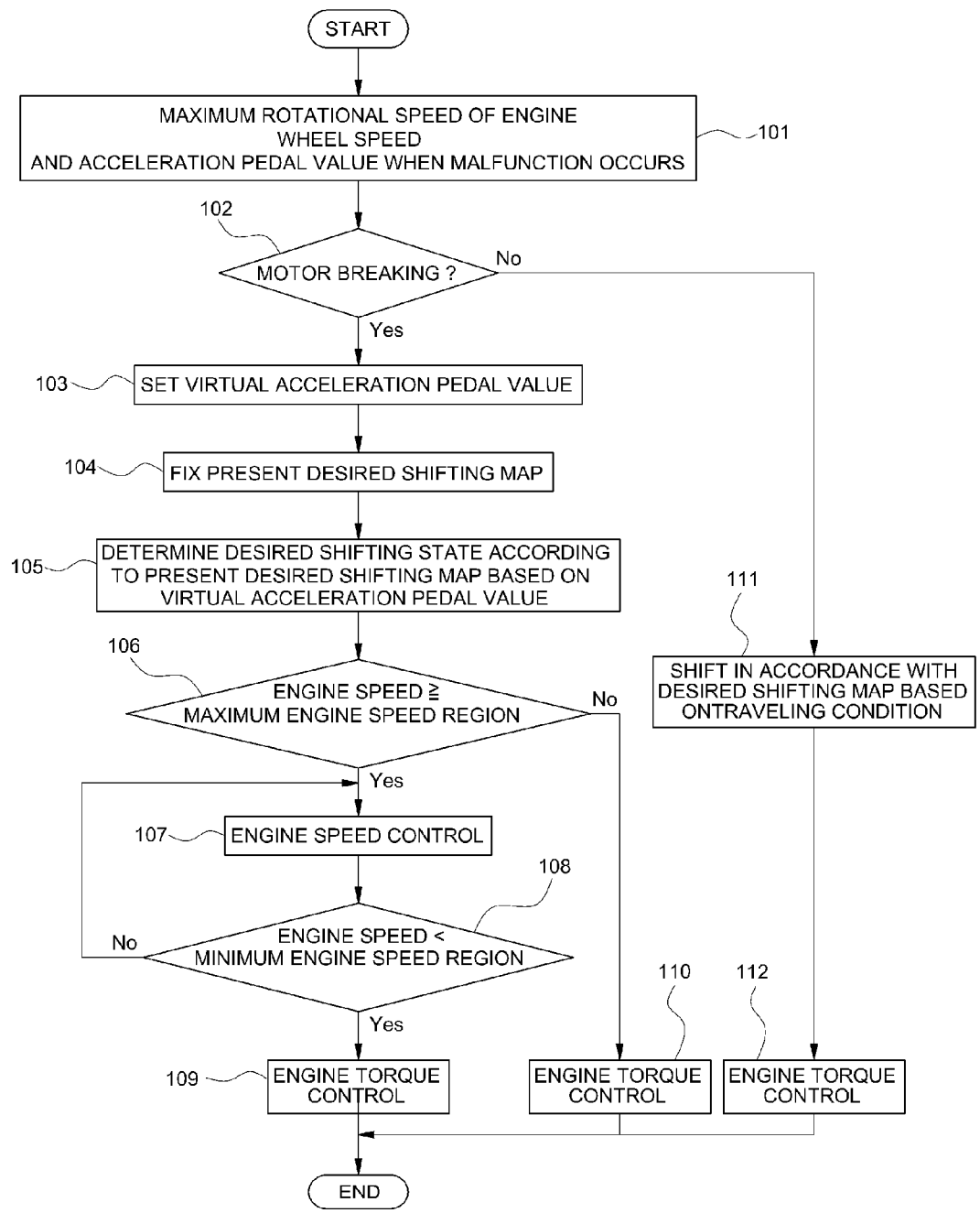
FIG. 2 is a flowchart illustrating example steps of a method for protecting a high voltage battery in a hybrid electric vehicle according to an embodiment of the present invention.
Figure 3:
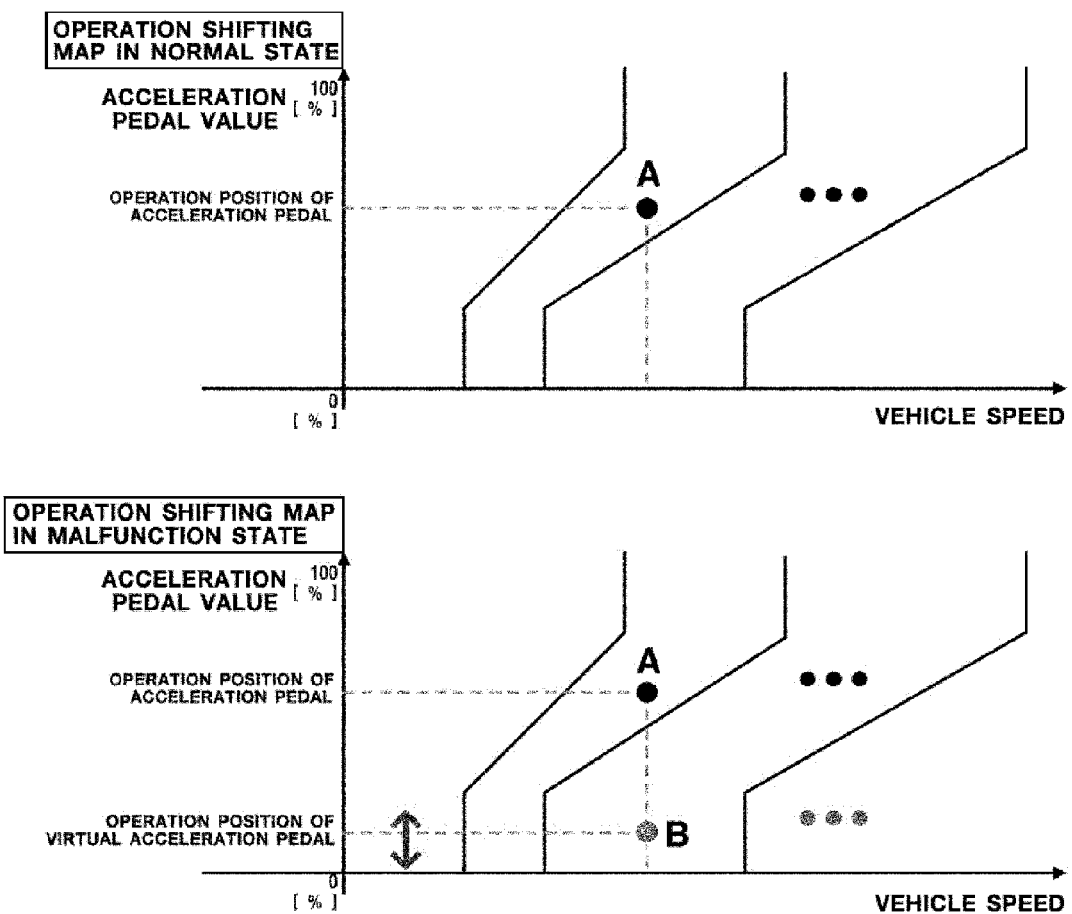
FIG. 3 is a graph showing when shifting stages are controlled by a virtual acceleration pedal value when protecting a high voltage battery in hybrid electric vehicle according to the present invention.
Figure 4:
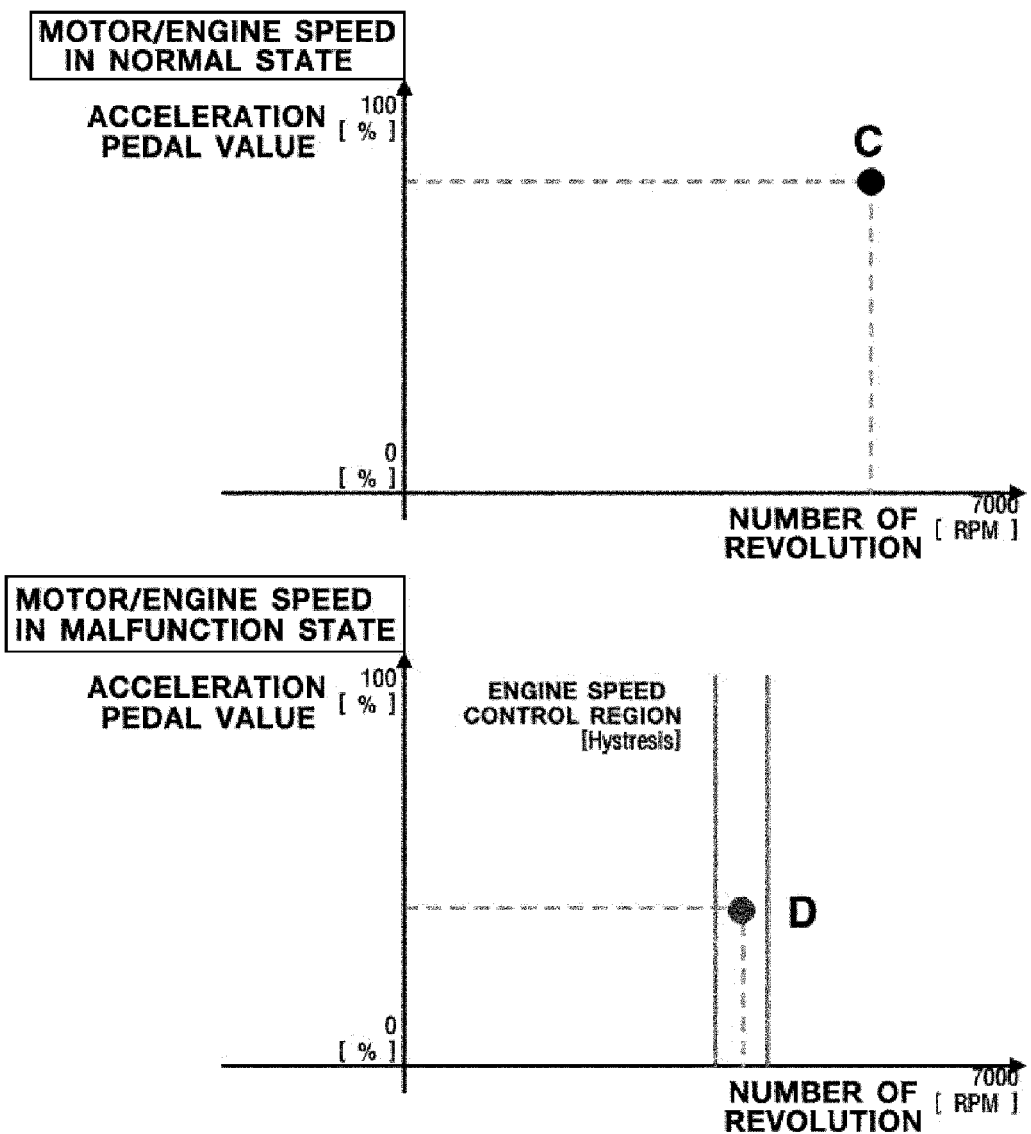
FIG. 4 is a graph showing configuration of an engine control mode according to the engine speed according to the present invention.

FIG. 2 is a flowchart illustrating in detail the steps of a method for protecting a high voltage battery in a hybrid electric vehicle according to an embodiment of the present invention, FIG. 3 is a graph showing when shifting stages are controlled by a virtual acceleration pedal values in the method for protecting a high voltage battery in a hybrid electric vehicle according to the present invention, and FIG. 4 is a graph showing switch of an engine control mode according to the engine speed in the method for protecting a high voltage battery in a hybrid electric vehicle according to the present invention.

As shown in FIGS. 2 to 4, in a method for protecting a high voltage battery in a hybrid electric vehicle according to the present invention, control for preventing a battery from being overcharged can be performed in two tomes of controlling shifting stages according to virtual acceleration pedal values and switching an engine control mode in accordance with the engine speed control region.

Referring to FIG. 2, in the method for protecting a high voltage battery in a hybrid electric vehicle according to the present invention, when a motor breaks, the maximum engine rotation speed, the wheel speed (vehicle speed), and the acceleration pedal value at the point of malfunction time are checked (step 101).

Next, after it is ascertained whether the motor breaks (step 102), when it is determined that the motor does not break, shifting according to a desired shifting map for the present traveling conditions is performed (step 111) and a common engine torque control is performed (step 112).

Meanwhile, when it is determined that the motor breaks in the step 102, a series of control for preventing the high voltage battery from being overcharged are performed (step 103 to step 110).

In detail, when it is determined that the motor breaks in step 102, a virtual acceleration pedal value for performing shifting state control is set to prevent overcharging (step 103) and the desired shifting map is fixed to (kept at) the present desired shifting map to prevent unnecessary shifting (step 104).

Next, a desired shifting stage according to the present desired shifting map is determined based on the virtual acceleration pedal value set in the step 103 (step 105).

The steps 103 to step 105 are described in detail with reference to FIG. 3.

FIG. 3 shows a shifting map under normal traveling condition, in the upper graph, in which the point A indicates the acceleration pedal value at the normal state.

The lower graph in FIG. 3 shows when the motor breaks, in which the shifting map is kept the same as the normal state when the motor breaks, while a virtual acceleration pedal value B for preventing overcharging is set, unlike the acceleration pedal value A in the normal state, thereby controlling the shifting states.

Next, referring again to FIG. 2, when the desired shifting state has been determined by the steps described above, control for switching or keeping the control mode of the engine is performed to prevent high-speed rotation of the motor (step 106 to step 110).

In those steps, as shown in FIG. 2, engine torque control that is performed in the normal state is switched to an engine speed control in a predetermined state, as described below.

In order to determine to keep or switch the engine control mode, in the present invention, as shown in FIG. 4, a predetermined engine speed control region is set and it is determined whether to switch or keep the engine control mode in consideration of the upper and lower limit of the region.

The engine speed control region of the present invention is a region relating to an engine speed that is determined in advance in connection with switching or returning the engine control mode, in consideration of the engine speed control performance.

A detailed example of the engine speed control region is a rotational speed (rpm) shown in FIG. 4, and the critical values of the upper and lower limits in the region shown in FIG. 4 become references for switching or keeping the engine control mode. Hereinafter, the upper and lower limits are determined the maximum engine speed region and the minimum engine speed region in the present invention.

In the method for protecting a high voltage battery in a hybrid electric vehicle according to the present invention, with reference again to FIG. 2, whether to switch the engine control mode to the engine speed control mode is determined by comparing the maximum engine speed region with the present engine speed (step 106).

Therefore, it is determined when the present engine speed is larger than or the same as the value of the maximum engine speed region in accordance with the comparison, it is determined that the battery may be overcharged by high-speed rotation of the engine or the motor and the engine control mode is switched to the engine speed control mode (step 107).

On the contrary, when it is determined that the present engine speed is smaller than the value of the maximum engine speed region in step 106, the engine control mode is kept to the present engine torque control (step 110).

Meanwhile, in the case the engine control mode has been switched to the engine speed control mode by the step 107, the present engine speed and the value of the minimum engine speed region are compared (step 108), such that when the present engine speed is lower than the value of the minimum engine speed region, the engine speed control is stopped and the control returns to the engine torque control (step 109).

Referring again to FIG. 4, switching the engine control mode is now described in detail. The point C in the upper graph in FIG. 4 indicates the number of engine/motor revolution according to the actual acceleration pedal value in the normal state, while the point D in the lower graph in FIG. 4 indicates the number of motor/engine revolution according to a virtual acceleration pedal value when the motor breaks.

In particular, in the lower graph shown in FIG. 4, the regions having the upper and lower limits of the number or revolution implies the engine speed control region, in which the left lower limit in the region is the minimum engine speed region and the right upper limit is the maximum engine speed region.

Therefore, the point D shown in FIG. 4 is a point between the maximum engine speed region and the minimum engines speed region, where whether to perform the engine speed control or the engine torque control is determined in accordance with whether the present engine control mode has been switched.

That is, when the engine control mode has been switched and the present engine speed control is performed at the point D of FIG. 4, it fails to reach the value of the minimum engine speed region which is a reference for returning to the engine torque control, such that the present state is kept and the engine speed control is continued.

On the other hand, when the engine torque control is still performed at the point D of FIG. 4, the control is switched to the engine speed control after the number of revolution of the engine reaches the maximum engine speed region, such that the engine torque mode that is the present state is kept at the point D.

Therefore, it is possible in the present invention to reduce excessive shifting and prevent the battery from being overcharged when the motor breaks, by implementing a logic for switching the engine control mode for preventing high-speed rotation of the motor while controlling the shifting stages in accordance with the virtual acceleration pedal values, with the desired shifting map fixed.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents. For example, the invention may be embodied as a tangible, non-transitory computer-readable media comprising software, in which the software when executed by a processor is operable to perform one or more aspects of the techniques described above.

What is claimed is:

1. A method for protecting a high voltage battery in a hybrid electric vehicle, comprising:
    checking whether a motor functions properly;
    in response to the motor not functioning properly, setting a virtual acceleration pedal value while keeping a present desired shifting map; and
    determining a desired shifting stage according to the present desired shifting map based on the virtual acceleration pedal value.

2. The method of claim 1, further comprising:
    configuring an engine control mode based on comparing a value of a predetermined maximum engine speed region with a present engine speed in order to prevent high-speed rotation of the motor, after determining the desired shifting stage.

3. The method of claim 2, wherein configuring the engine control mode comprises:
    switching the engine control mode to an engine speed control, when the present engine speed is larger than or the same as the value of the maximum engine speed region.

4. The method of claim 3, wherein configuring the engine control mode further comprises:
    stopping the engine speed control and switching the engine control mode to the engine torque control mode, in the case the engine control mode has been switched to the engine speed control mode and the present engine speed is lower than a value of a minimum engine speed region.

5. The method of claim 2, wherein configuring the engine control mode further comprises:
    keeping the engine control mode in the engine torque control, when the present engine speed is lower than the value of the maximum engine speed region.

6. A system for use in an electric vehicle, the system comprising:
    a high voltage battery;
    a drive motor powered by the high voltage battery; and
    a controller configured to:
        check whether the motor functions properly;
        set a virtual acceleration pedal value while keeping a present desired shifting map in response to the motor not functioning properly; and
        determine a desired shifting stage according to the present desired shifting map based on the virtual acceleration pedal value.

7. The system of claim 6, wherein the controller is further configured to:
    configure an engine control mode based on comparing a value of a predetermined maximum engine speed region with a present engine speed in order to prevent high-speed rotation of the motor, after determining the desired shifting stage.

8. The system of claim 7, wherein the controller is further configured to: configure the engine control mode by switching the engine control mode to an engine speed control, when the present engine speed is larger than or the same as the value of the maximum engine speed region.

9. The system of claim 8, wherein the controller is further configured to: configure the engine control mode by stopping the engine speed control and switching the engine control mode to the engine torque control mode, in the case the engine control mode has been switched to the engine speed control mode and the present engine speed is lower than a value of a minimum engine speed region.

10. The system of claim 7, wherein the controller is further configured to: configure the engine control mode by keeping the engine control mode in the engine torque control, when the present engine speed is lower than the value of the maximum engine speed region.

11. A tangible, non-transitory computer-readable media comprising software, in which the software when executed by a processor in an electric vehicle is operable to:
    check whether a motor, powered by high voltage battery, functions properly;
    set a virtual acceleration pedal value while keeping a present desired shifting map in response to the motor not functioning properly; and
    determine a desired shifting stage according to the present desired shifting map based on the virtual acceleration pedal value.

12. The computer-readable media of claim 11, wherein the software when executed is further operable to:
    configure an engine control mode based on comparing a value of a predetermined maximum engine speed region with a present engine speed in order to prevent high-speed rotation of the motor, after determining the desired shifting stage.

13. The system of claim 12, wherein the software when executed is further operable to: configure the engine control mode by switching the engine control mode to an engine speed control, when the present engine speed is larger than or the same as the value of the maximum engine speed region.

14. The system of claim 13, wherein the software when executed is further operable to: configure the engine control mode by stopping the engine speed control and switching the engine control mode to the engine torque control mode, in the case the engine control mode has been switched to the engine speed control mode and the present engine speed is lower than a value of a minimum engine speed region.

15. The system of claim 12, wherein the software when executed is further operable to: configure the engine control mode by keeping the engine control mode in the engine torque control, when the present engine speed is lower than the value of the maximum engine speed region.

* * * * *